Oct. 2, 1928.
L. J. LEON
PARROT CAGE
Filed Nov. 6, 1925    3 Sheets-Sheet 3
1,685,922
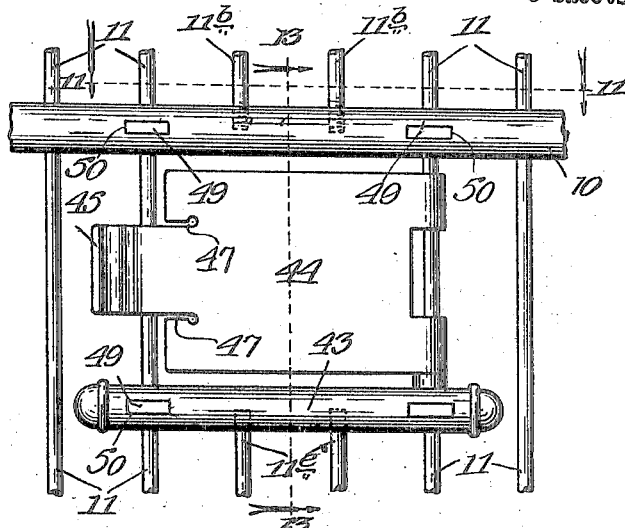
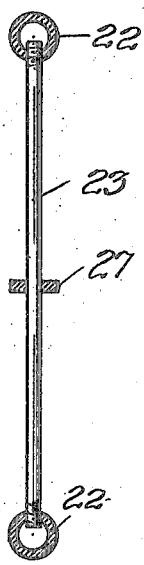
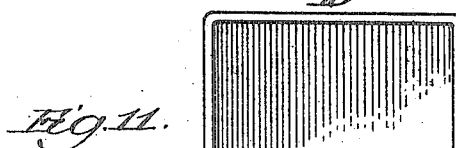
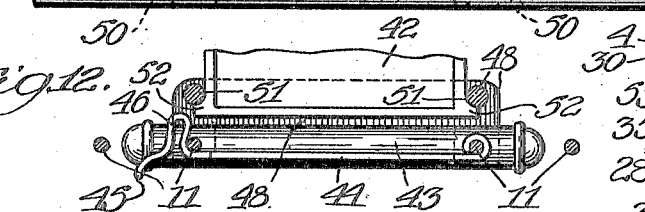
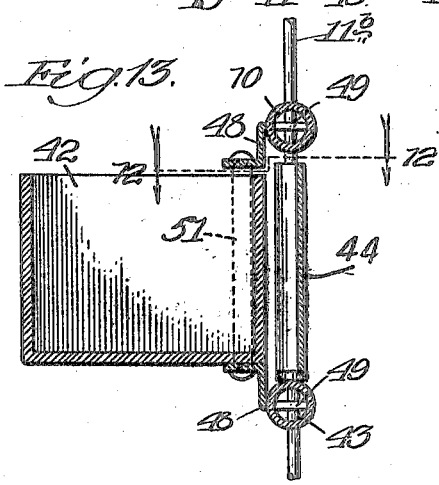
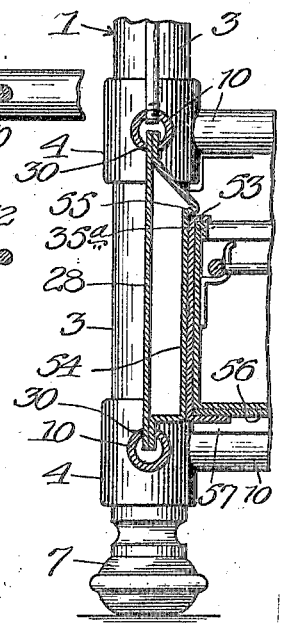
Inventor:
L. J. Leon, Patented Oct. 2, 1928.

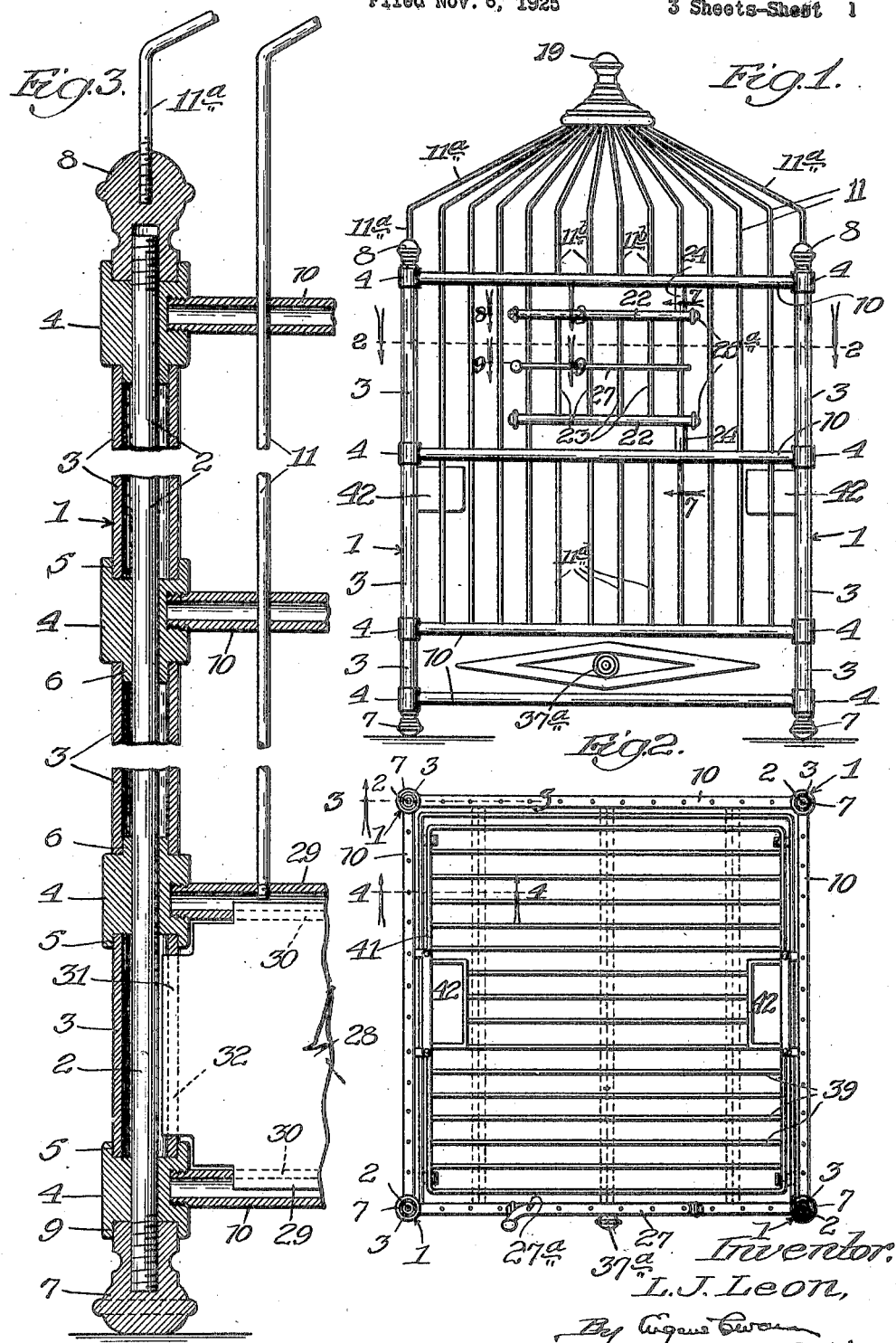

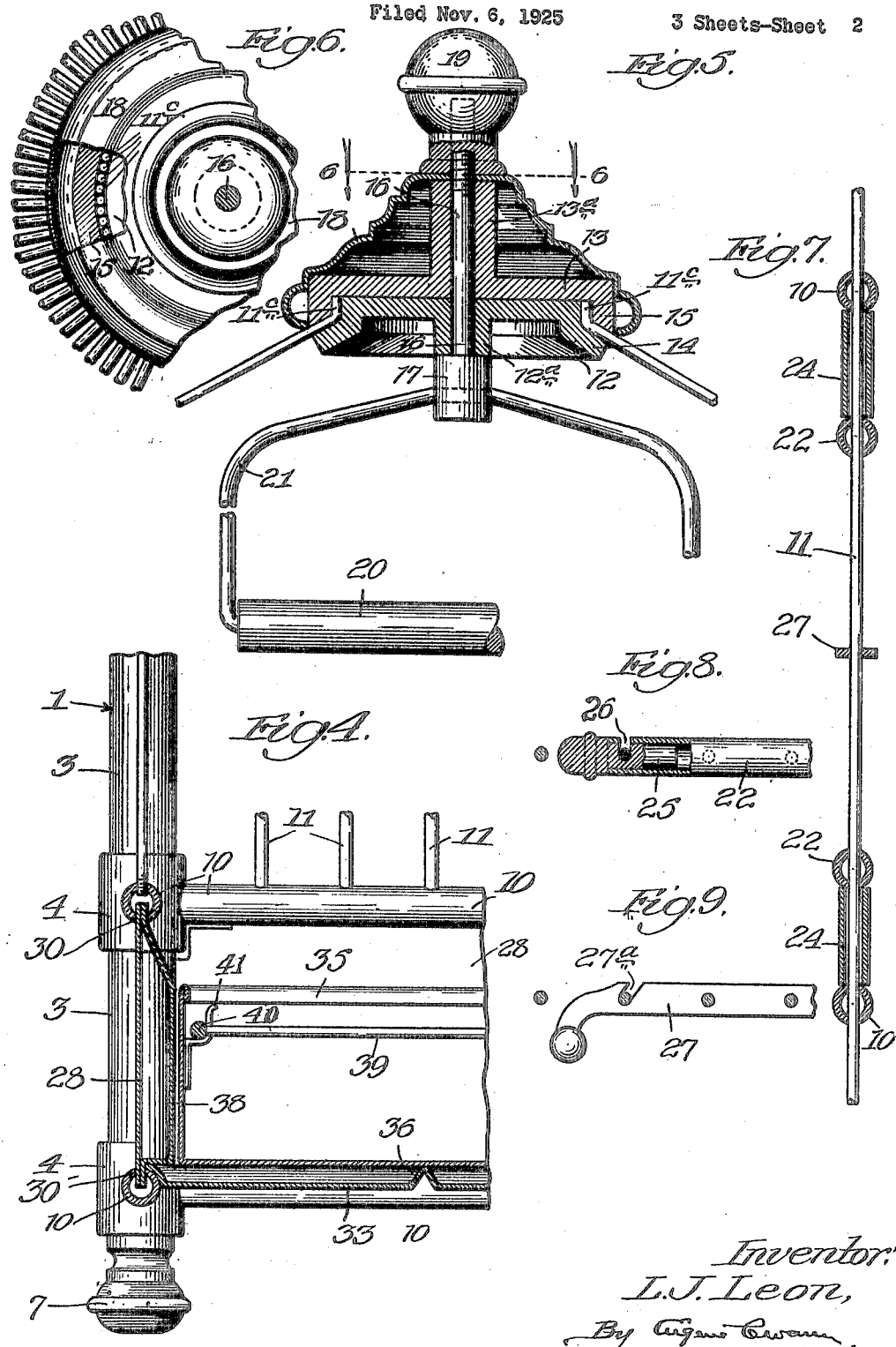

1,685,922

UNITED STATES PATENT OFFICE.

LEWICKI J. LEON, OF WEST CHICAGO, ILLINOIS.

PARROT CAGE.

Application filed November 6, 1925. Serial No. 67,229.

This invention relates to parrot and like cages.

Heretofore these cages have been made along the same general lines as cages for canaries and smaller birds, with soldering of the wires at the top of the cage and riveting or upsetting the lower ends of the wires at the base or bottom of the structure. Except for being larger, these cages followed the same general design and principles of construction as the smaller cages. As with the latter, the larger cages so made had to be finished or polished after assembly, this being required because the wires and other parts could not be connected without marring the finish of the same. With the wires permanently secured in place, the cage could not be readily or easily repaired nor refinished. Furthermore these larger cages were not durable, due to general weakness and lack of strength in their structure.

One object of my invention is to generally improve the appearance and the construction of cages of this larger kind, and make them strong and more durable than heretofore.

Another object of my invention is to connect the wires and parts together in such a way that the cage may be assembled after the wires and parts have been finished or polished without marring the luster thereof.

A further object of my invention is to make the cage in units so that it may be readily built up and thus produced on a production basis.

Another object of my invention is to employ threads as the means of connection between many of the parts so that they may not only be easily and readily connected and disconnected (as for repair) but may be drawn or clamped tightly together, as the case may be, for producing a rigid and strong cage structure as necessarily required for larger birds.

A further object of my invention is to form the frame of the cage of upright posts and cross-members in threaded connection for ready assembly and repair and also for producing a strong and rigid cage construction.

Another object of my invention is to make the cage vermin proof by having all slots and openings closed against the collection of seed, dirt, and the like.

A further object of my invention is to improve the door and feed cup mountings and fixtures and to also improve the wire fastening means at the top of the cage so that the connection thereof may be made without solder and may be released for assembly and repair.

The invention consists further in the matters hereinafter described and claimed.

In the accompanying drawings—

Fig. 1 is a front view of my improved cage;

Fig. 2 is a horizontal sectional view on line 2—2 of Fig. 1;

Fig. 3 is an enlarged vertical sectional view through one of the corner posts on line 3—3 of Fig. 2;

Fig. 4 is an enlarged vertical sectional view taken on line 4—4 of Fig. 2;

Fig. 5 is an enlarged vertical sectional view through the top construction of the cage;

Fig. 6 is a fragmentary horizontal sectional view taken on line 6—6 of Fig. 5;

Fig. 7 is an enlarged vertical sectional view taken on line 7—7 of Fig. 1 to show the door mounting;

Figs. 8 and 9 are sectional views taken on lines 8—8 and 9—9, respectively, of Fig. 1, to show details of structure incidental to the door construction;

Fig. 10 is an enlarged front view of one of the feed cup holders;

Fig. 11 is a horizontal sectional view taken on line 11—11 of Fig. 10;

Fig. 12 is a horizontal sectional view taken on line 12—12 of Fig. 13;

Fig. 13 is a vertical sectional view taken on line 13—13 of Fig. 10;

Fig. 14 is a vertical sectional view showing a form of structure to be hereinafter decribed; and Fig. 15 is a view of a detail of construction to be hereinafter described.

As shown in the drawings, my improved cage has upright posts 1, 1 spaced about the same and constituting a part of the cage body. When the cage is square in cross-section, as shown in Figs. 1 and 2, these posts are at the corners of the cage.

Each post 1, as shown in Fig. 3, has an inside rod 2 extending the full length of the post. On this rod are a plurality of alternating members 3, 4, the former being longer than the latter, as shown. The members 3 are in the form of tubes and space apart the members 4, which serve as joiners or connectors in the cage construction. The members 3, 4 have interfitting connection at their ends to hold them in place, the tubes fitting in sockets 5 and over projections 6, respectively, in the connectors 4, as shown.

The tubes 3 and members 4 are clamped together end to end by a foot piece 7 screwed on the lower end of the rod 2 and a top ornament 8 screwed on the upper end of the rod. The lowermost member 4 has a socket 9 on its under side to receive the upper end of the foot piece 7, as shown. The uppermost member 4 is arranged with its socket 5 uppermost to receive the lower end of the top ornament 8.

Horizontal cross-members 10, 10 extend around the cage between the connectors 4, 4 of the several posts. These cross-members 10 are preferably in the form of tubes and have right and left threaded connection at their ends with the associated connectors 4, 4 to tie the posts together, as shown in Figs. 2 and 3. The lowermost tubes 3 of the posts 1 are much shorter than the tubes 3 thereabove, thus bringing the bottom pairs of cross-members 10, 10 closer together than the ones above, as shown in Fig. 1. The base structure of the cage occupies the space between this lower set of cross-members.

The body of the cage above this lower set of cross-members is made up of a plurality of vertically extending wires or rods of a sufficient gauge to give rigidity and strength to the cage. The longest of these wires or rods are indicated by 11, 11 and they extend from the upper of the lower set of cross-members 10 to the ornament and fastener at the top of the cage. These wires or rods 11 extend through holes drilled or otherwise formed in the cross-members 10, 10 and have their lower ends screwed into the upper cross-members 10 in the lower set, as shown in Fig. 3. By this connection, the wires may be connected with the cross-members without using solder and without riveting the lower ends of the wires as usually followed in smaller cages.

The upper ends of the wires or rods 11 extend above the posts 1 and continue on at angles to the top of the cage where they are clamped in place, as shown. The top of the cage includes other wires or rods $11^a$ and $11^b$ bent at angles in conformity with the bending of the upper ends of the wires 11 so as to give an inclined or slanting roof or top to the cage, as shown. The wires or rods $11^a$, $11^a$ have their lower ends threaded for engagement with the top ornaments 8 of the posts 1, 1. The wires or rods $11^b$, $11^b$ terminate at the uppermost cross-members 10 and have their lower ends screwed into the same, as shown in Fig. 10.

The upper ends of all of the rods or wires 11 to $11^b$ are clamped between members 12 and 13 of the top ornament and fastener assembly, as shown in Figs. 5 and 6. These members 12, 13 are in the form of annular plates or discs and have depending peripheral flanges 14, 15. These flanges are radially spaced apart to provide an annular channel to receive the upper ends of the wires. The outer or entrance end of the channel is inclined at the same angle as the wires so as to receive them and allow the plates to be clamped tightly against the wires for holding them in place.

The extreme upper ends of the wires 11 to $11^b$ are bent to extend vertically upward, as at $11^c$ (Fig. 5), and the inner end of the channel is likewise disposed or shaped to receive these ends. By this construction the upright portion of the plate 12 at the rear of the channel forms an annular stop or abutment for the wires in assembling the cage and positions the wires at the same distance outward from the center of the plates without making it necessary to use a special jig or guide in the assembly of the wires. The other plate 13 extends over the top ends of the wires and holds them down against the flange 14 of the lower plate 12. This prevents the wires from rising out of place when the plates are clamped or secured together.

The plates 12, 13 are clamped together by a bolt 16 having its head 17 below a central boss $12^a$ on the under side of the plate 12. The bolt 16 extends upward through an elongated central boss $13^a$ on the upper side of the plate 13, these bosses providing a long bearing for the bolt. The upper end of the bolt 16 extends through the top of an ornamental sheet metal shell 18 and receives a nut in the form of a top ornament 19, as shown in Fig. 5, for clamping the parts together. The shell 18 rests on the upper end of the boss $13^a$ and the latter prevents the shell from being crushed by the nut 19 as it is clamped against the same.

The swinging perch of the cage consists of a horizontal cross-member 20 and a wire bail 21, the latter being suspended from the head 17 of the bolt, as shown in Fig. 5.

The door for the cage is constructed as follows. Vertically disposed wires $11^d$, $11^d$ are between the upper of the lower set of cross-members 10 and the cross-member next above, as shown in Fig. 1. These wires $11^d$ are aligned with the wires $11^b$ in the top of the cage. Wires $11^d$ terminate at the cross-members 10, 10 between which they extend and have right and left-handed screw-threaded connection therewith in the same manner, as shown in Fig. 15. Terminating the wires $11^b$, $11^d$ in the manner described provides a space for the swinging door.

The door consists of a pair of upper and lower cross-members 22, 22 preferably in the form of tubes and having a swinging or pivotal connection at one end with one of the wires or rods 11. These cross-members 22, 22 are connected together by vertical wires 23, 23 in line with the associated wires $11^b$, $11^d$, as shown in Fig. 1. The wire 11 at the hinged end of the door extends through the members 22, 22, as shown in Fig. 7, and said members are spaced from the cross-members 10, 10 above and below the door by tubular spacers 24, 24, as shown in Figs. 1 and 7.

The ends of the members 22, 22 are closed by plugs 25, 25ª having ornamental outer ends as shown in Figs. 1 and 8. Notches 26, 26 are made in the cross-members 22 at the swinging end of the door (Fig. 8) and these notches extend into the plugs 25 and receive the adjacent wire or rod 11 when the door is closed. These notches are disposed so that the wire 11 passes freely into and out of the same in opening and closing the door.

The door carries a flat latch 27 arranged between the members 22, 22 and through which the wires 23 extend, as shown in Figs. 1 and 9. The latch 27 has an inclined notch 27ª to hook over the adjacent wire 11 and hold the door closed. By springing this wire out of this notch the door may be swung open.

The spaces between the cross-members 10, 10 of the lower set are closed on three sides of the cage by upright panels 28, 28 of sheet metal. The upper and lower marginal portions 29, 29 of these panels extend into slots 30 provided in the associated upper and lower cross-members 10, 10 of the lower set, as shown in Figs. 3 and 4. The end margins 31 of the panels extend into the slots 32 in the associated tubes 3, 3 in the base structure, as shown in Fig. 3. These slots 29 and 32 terminate short of the ends of their respective members, so as not to weaken the ends of the same. The panels 28 rest on the lower members 10 beyond the ends of the slots therein, as shown in Fig. 3. The bottom of the base structure is in the form of a removable sheet metal tray or pan 33 having its side margins flanged upward, as at 34, to rest on the bottom cross-members 10, 10, as shown in Fig. 4.

A sliding drawer 35 is provided at the bottom of the cage and is supported on upright ribs 36 provided on or struck up from the pan 33, as shown in Fig. 4. The front wall 37 of the drawer has a knob 37ª, and this wall when closed fills the space between the cross-members 10, 10 at the front of the cage and is suitably ornamented to conform to the ornamentation that may be used on the panels 28, 28.

To take up the space between the sides of the drawer and the associated panels, I provide sheet metal plates 38, 38 inside of these panels, as shown in Fig. 4. These plates 38 are bent to have inwardly extending midportions to form guide walls for the sides of the drawer, as shown in said figure. The upper and lower margins of the plates 38 extend into the slots 29, 30 in the associated cross-members 10, as shown. The lower portions of the inner plates 38 are given right-angle bends, as shown in Fig. 4, so that the plates will maintain the drawer 35 in place in the cage. A similar plate 38 may be provided for the rear of the drawer.

The drawer 35 carries adjacent its upper edge a grating formed of a plurality of crossed wires 39 in a surrounding marginal frame 40. This frame is supported in the drawer by brackets 41 secured to the inside of the upright marginal walls of the drawer, as shown in Fig. 4. The grating prevents the bird from getting down into the drawer to scatter seed and other particles in the drawer out of the same.

The cage has seed and water cups 42, 42 on opposite sides of the same, as shown in Fig. 2.

The structure for mounting these cups is the same for both. At the cups the wires 11ª (Fig. 10) in the section of the cage beneath the cross-members 10, 10 below the door fall short of said cross-members and are screwed into a short cross-member 43, as shown in Fig. 10. Above this cross-member 43 there is a vertically disposed plate 44 having hinged connection at one end with one of the wires 11. The plate 44 is formed from sheet metal and is provided with a finger grasping projection 45 at its opposite end. This projection has a tongue 46 to resiliently engage about the adjacent wire 11 for holding the plate closed. The plate is provided along the upper and lower edges of the projection 45 with inwardly extending slots 47, which give the necessary resilience to the projection 45 so as to snap on and off the wire 11 in closing and opening the plate.

Bars 48, 48 are above and below the cup 42. These bars are substantially Z-shape and have outwardly projecting tongues 49, 49 to extend through slots 50, 50 in the bar 43 and the member 10 immediately above the same, as shown in Fig. 10. The wires 11, 11 at the opposite ends of the plate 44 extend through these tongues for attaching the bars 48 to the cage. The cup 42 is inserted between these bars and rests on the lower one, as shown in Fig. 13. Vertically arranged rods 51, 51 extend between these bars at the ends thereof, and are on opposite sides of the cup when the latter is in place. The cup is prevented from passing inward between these bars by lugs 52, 52 formed on the cup at the side edges thereof, as shown in Fig. 12, said lugs engaging the rods 51, as shown. To remove the cups, the plates 44 are swung open and the cups drawn outward from between the rods 51 and through the openings made in the cage body when the plates are open.

From the construction shown and described, it is apparent that cross-members 10 and their associated connectors 4, 4 provide horizontal units for the frame, these units being spaced apart and connected by the tubes 3 and rods 2, respectively, thereby facilitating the manufacture, assembly and repair of the cage. Being in units, the parts may be made on a production and thereby commercial basis as the units may be made in standard sizes. Also the units permit the cage to be made any height desired by merely increasing the length of the wires and other parts which extend from the top to the bottom of the cage.

The tubular sections 3 of the posts are spaced apart and connected by the substantially solid connectors 4 which add rigidity and strength to the cage without materially increasing the weight thereof. This post construction also enables the connectors 4 and sections 3 to be made relatively large in diameter and thus they may be readily handled and polished and be afterwards assembled in the cage. Moreover, the wires are of sufficient gauge to enable them to be polished before insertion in the cage body, and, by having the screw-threaded connection for the wires and the associated members, the wires may be assembled in the cage after polishing without the use of upsetting or soldering. Moreover, by having the wires and parts connected in the manner described, the cage is strong and durable because the parts may be tightly clamped or drawn together as the case may require. By these connections, the cage may be taken apart for refinishing as well as repair.

In addition to the above, the cage has a pleasing and symmetrical appearance and is vermin proof because all slots and openings are filled up and are not left open for the collection of seed, refuse, and the like. The plugs 25, 25$^a$ close the ends of the cross-members 22 for this purpose, and likewise do the panels 28 and plates 38 close the slots 29, 30 and 32 in the associated sections 3 and cross-members 10.

Fig. 14 shows a form of drawer mounting. As illustrated, there is a channel member 53 secured to the inner surface of the plate 54. The drawer 35$^a$ slides in this channel member and is supported on the same and the corresponding member at the opposite side of the cage. The plate 54 is provided adjacent its upper end with a stop shoulder 55 to position the channel member at the time of assembling the cage. This channel member is soldered or otherwise rigidly secured to the plate 54. The bottom of the cage is closed by a flat plate 56 arranged beneath the bottom of the drawer and supported by the bottom flanges of the channel members. This plate 56 is provided at its rear edge with a depending flat flange 57, which extends down back of the base flange of the channel member to hold the plate from sliding out with the drawer. The front edge of the plate may be flanged to extend down to the front lowermost cross-member 10 and close the space between the plate and the cross-member for finishing purposes.

The details of construction may be variously changed and modified without departing from the spirit and scope of my invention.

I claim as my invention:

1. A portable bird cage, comprising a frame structure made up of a multiplicity of horizontally disposed units extending completely about the cage, each unit consisting of cross-members and couplings therefor at the adjacent ends of the cross-members and releasably connected therewith, upright spacing elements between the several units at the couplings thereof and engaged with and separated by said couplings for vertically spacing the units apart, means for clamping the spacing elements and couplings together, and upwardly extending wires making up the cage body between the spacing elements and having releasable connection with the cross-members so that the wires may be assembled in the frame after the latter has been completely set up.

2. A portable bird cage, comprising upright posts spaced apart about the cage, each post consisting of an inside rod and superimposed sections clamped thereon, horizontally disposed cross-members extending between the posts and secured to certain of the sections thereon for connecting the posts together, plates forming an enclosure at the bottom of the cage and engaged with the lowermost sections and cross-members of said frame, and upwardly extending wires forming the cage body between the posts above said enclosure and engaged with the cross-members above the same.

3. A portable bird cage, comprising upright posts spaced apart about the same, each post consisting of an inside rod and superimposed alternating longer and shorter sections thereon, horizontally disposed cross-members extending between the shorter sections on the posts and secured thereto for connecting the posts together, plates forming an enclosure about the bottom of the frame and engaged with the lowermost sections and cross-members of said frame, and wires forming the cage body between the posts above the enclosure and engaged with the cross-members above the same.

4. In a cage, upright posts spaced apart about the cage, each post being formed of an inside rod and superimposed sections thereon, the sections on each post having interfitting engagement at their ends with the sections at the ends of the post screwed thereon for clamping the sections on the rod, horizontally disposed cross-members extending between the posts and screwed into certain of the sections for connecting the posts together, and wires engaged with the cross-members and forming the cage between the posts.

5. A portable bird cage, comprising upright posts spaced apart about the cage, each post being formed of an inside rod and superimposed sections clamped thereon, horizontally disposed cross-members extending between the posts and secured to certain of the sections for connecting the posts together, and upright wires forming the cage between the posts and engaged with the cross-members, said wires, sections and cross-members being so connected with their associated parts as to permit assembly thereof after polishing or finishing the same.

6. In a cage having its top formed of upwardly inclined and inwardly converging wires, a pair of disc shaped plates having depending flanges at the outer margins thereof to receive between them the inner ends of the wires, the latter being bent upward to enter between said flanges, said flanges having inclined surfaces to engage the wires beyond their bent ends with the inner flange forming a stop or abutment for said ends, and means for clamping the plates together.

7. In a cage having its top formed of inwardly converging wires, a pair of superimposed plates receiving the inner ends of the wires, a bolt extending through said plates for clamping the same together, said plates having centrally disposed bosses for the bolt, and a shell supported by the boss on the top plate and extending over and about the same.

8. In a cage having its top formed of inwardly converging wires, a pair of superimposed disc-shaped plates at the inner ends of the wires with the wires between them, said plates having centrally disposed bosses extending above and below the same, a bolt extending through said bosses, a top ornament screwed on the upper end of the bolt for clamping the plates together, and a shell clamped against the upper boss by said bolt and extending about the upper plate.

9. In a base structure for cages, upright posts, horizontally disposed cross-members extending between and connected with said posts, upright panels between the cross-members part way around the cage, said cross-members having slots to receive the upper and lower margins of said panels, and a drawer slidably mounted in the cage between the cross-members and having a front wall completing the panel arrangement of the cage when the drawer is closed.

10. In a base structure for cages, upright posts, horizontally disposed cross-members extending between and connected with said posts, upright panels between the cross-members part way about the cage, said cross-members and posts having elongated slots to receive the upper, lower, and end edges, respectively, of the panels, and a drawer slidably mounted on the cage between the cross-members and having a front wall completing the panel arrangement of the cage when the drawer is closed.

11. In a base structure for cages, upright posts, horizontally disposed cross-members extending between and connected with said posts, panels part way about the cage between the cross-members, a drawer slidably mounted in the cage between the cross-members and having a front wall completing the panel arrangement of the cage when the drawer is closed, and interior wall members at the sides of the drawer, said panels and wall members having their upper and lower and end edges in slots in the cross-members and posts, respectively.

12. In a base structure for a cage, upright corner posts, horizontally disposed cross-members extending between and connected with the posts, a removable plate between the lowermost cross-members and having its marginal portions resting thereon for closing the bottom of the base, and upright panels between the cross-members and engaged therewith and the posts.

13. In a cage, a plurality of upright wires having their upper ends converging to form the top of the cage, a pair of plates having marginal flanges with the upper ends of the wires between them, a bolt for clamping the plates together, said plates having bosses for said bolt and a swinging perch suspended from said bolt.

14. In a bird-cage having a feed cup opening, cross-members at the top and bottom of said opening, a feed cup frame inside the cage at said opening and having lugs extending into slots in said cross-members and releasably connected therewith by certain of the wires of the cage.

15. In a base structure for a cage, upright corner posts, horizontally disposed cross-members extending between and connected with said posts, upright panels engaged with the cross-members part way about the cage, a drawer slidable in said cage between said panels, and interior wall members at the sides of the base for filling in the spaces between the drawer and panels and having inwardly extending supporting flanges along their lower margins for the drawer.

In testimony whereof I affix my signature this 3rd day of November, 1925.

LEWICKI J. LEON.